BRUSHLESS DIRECT CURRENT MOTOR

Filed June 3, 1964 2 Sheets-Sheet 1

INVENTOR.
DAVID J. FORAN JR.

BY

W. E. Finken

HIS ATTORNEY

BRUSHLESS DIRECT CURRENT MOTOR

Filed June 3, 1964 2 Sheets-Sheet 2

INVENTOR.
DAVID J. FORAN JR.
BY
W. E. Finken
HIS ATTORNEY

United States Patent Office 3,297,891
Patented Jan. 10, 1967

1

3,297,891
BRUSHLESS DIRECT CURRENT MOTOR
David J. Foran, Jr., Rochester, N.Y., assignor to General Motors Corporation, Detroit, Mich., a corporation of Delaware
Filed June 3, 1964, Ser. No. 372,155
4 Claims. (Cl. 310—46)

This invention pertains to dynamoelectric machines, particularly to an improved brushless direct current motor.

Heretofore, brushless direct current motors of two different types have been manufactured, these types being a transistorized direct current to alternating current inverter for supplying power to a conventional alternating current induction motor and a transistorized commutation direct current motor. However, neither of these types of motors are suitable for automotive applications from the standpoint of size, performance or cost. At the present time direct current motors have numerous automotive applications, for example, windshield wiper drives, seat actuators, window actuators, blower motors and top lift motors.

I have determined that in order to produce an acceptable brushless automotive direct current electric motor, the brush and commutator assembly must be replaced with a less expensive combination than semi-conductors. To achieve this result the motor of my invention embodies magnetic reed switches controlled by permanent magnets for obtaining the necessary commutation for obtaining the desired performance characteristics of a direct current motor.

Accordingly, among my objects are the provision of a brushless direct current electric motor suitable for automotive applications; the further provision of a brushless direct current automotive motor having greater reliability than a conventional brush and commutator motor; the further provision of a brushless direct current motor capable of operating in explosive atmospheres due to the elimination of arcing and sparking; and the still further provision of an improved brushless direct current electric motor having improved efficiency and reduced motor noise.

The aforementioned and other objects are accomplished in the present invention by utilizing a permanent magnet rotor and a wound stator in combination with a plurality of magnetic reed switches as the commutating means for the direct current motor.

Further objects and advantages of the present invention will be apparent from the following description, reference being had to the accompanying drawings, wherein preferred embodiments of the present invention are clearly shown, and wherein similar numerals denote similar parts throughout the several views.

In the drawings:

FIGURE 1 is a longitudinal sectional view of a fixture model direct current motor constructed according to my invention.

FIGURES 2, 3 and 4 are sectional views taken along lines 2—2, 3—3, and 4—4 respectively of FIGURE 1.

Referring to FIGURES 1 through 5, the improved brushless direct current motor includes a frame 10 having

Figure 1:
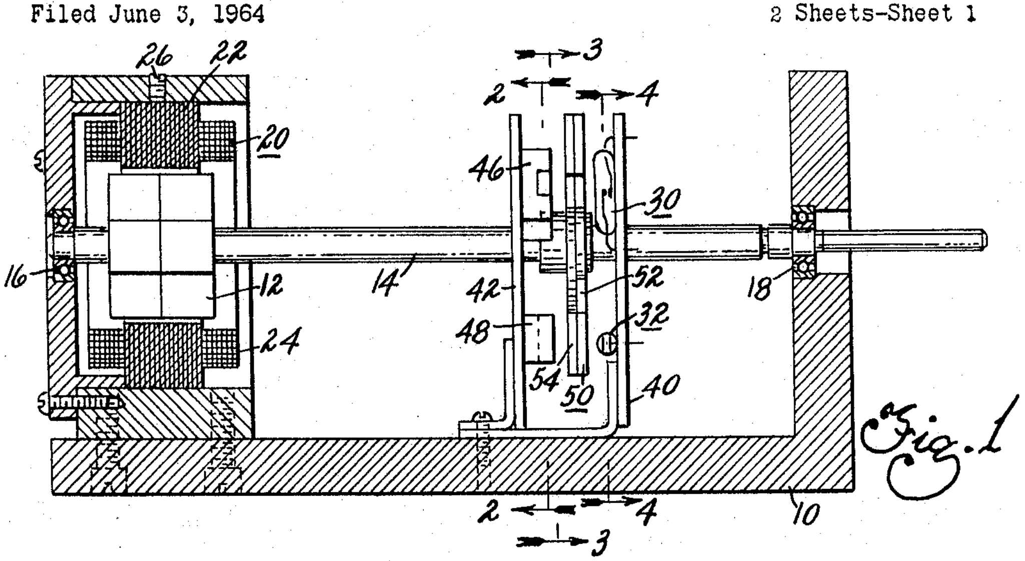

2 a four pole permanent magnet rotor 12 attached to a rotor shaft 14 by spaced ball bearing assemblies 16 and 18. The rotor 12 is encircled by a wound stator 20 comprising a laminated stator stack 22 and field coils 24. In the specific exemplary embodiment disclosed in FIGURE 1 the stator stack has 24 axial through slots with no skew. As shown in FIGURE 1, the stator assembly 20 is held in position by a set screw 26.

Figures 2, 3, 4, 5:
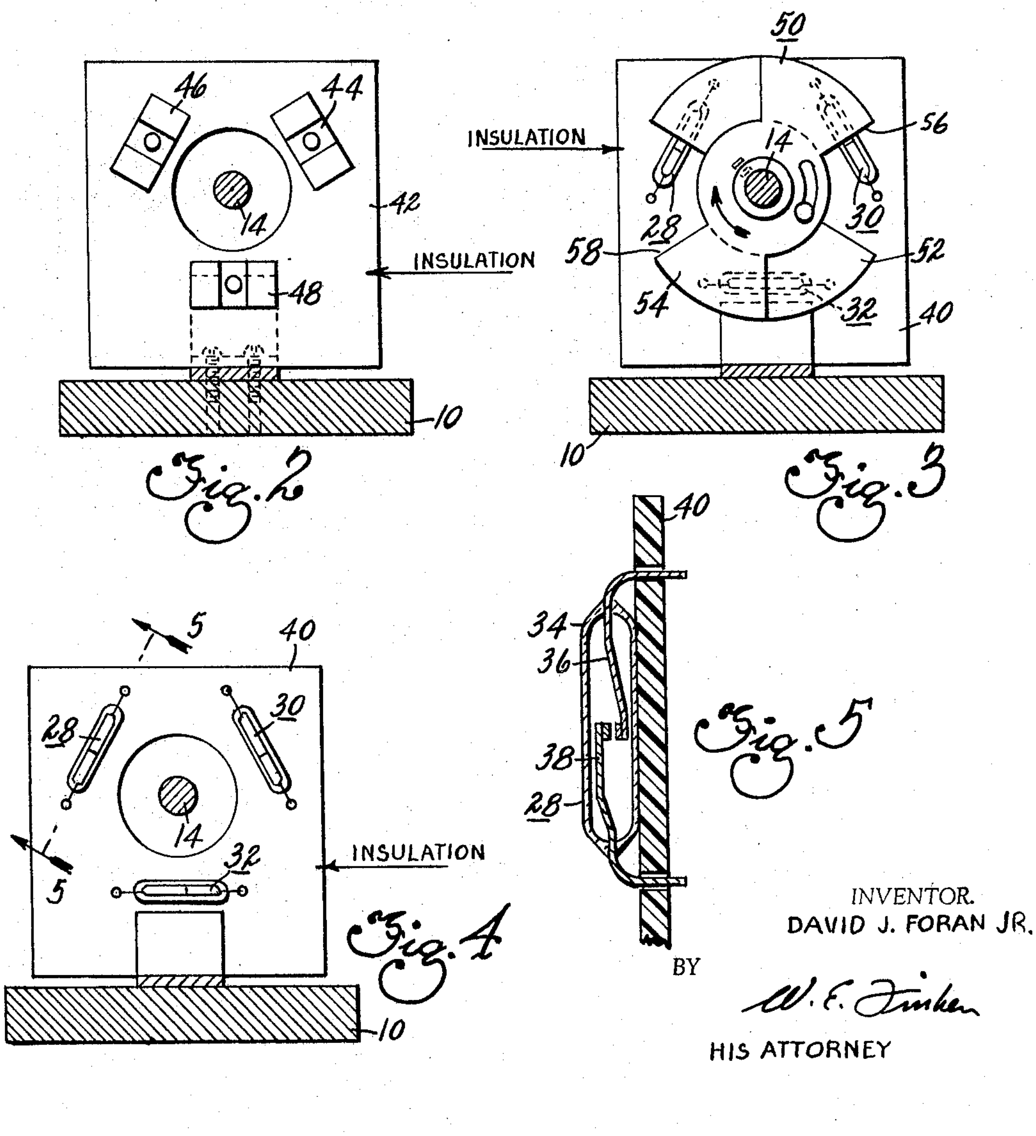
FIGURE 5 is an enlarged fragmentary sectional view taken along line 5—5 of FIGURE 4.

Motor commutation is obtained through three magnetic reed switches 28, 30 and 32 of identical construction. Each magnetic reed switch comprises an evacuated glass envelope 34, as shown in FIGURE 5, containing a pair of magnetic reeds 36 and 38 constituting switch contacts which can be actuated by an external magnetic field. The magnetic reed switches 28, 30 and 32 are mounted on centrally apertured insulating plate 40 attached to the frame 10 and are spaced radially outward of the rotor shaft 14 and angularly spaced apart by 120°. A second centrally apertured insulating plate 42 is mounted in axial spaced relation with respect to insulating plate 40 and carries three angularly spaced permanent magnets 44, 46 and 48, the plate 42 likewise being attached to the frame 10. A magnetic shield assembly 50 is attached to the rotor shaft 14 and is disposed between the two plates 40 and 42. The magnetic shield assembly 50 comprises a pair of angularly adjustable discs 52 and 54 having cut-out portions so as to form a pair of adjustable slots, or windows, 56 and 58, each slot being adjustable from 60° to 120°. When either slot 56 or 58 is aligned with a magnet and its respective magnetic reed switch, the magnetic reed switch contacts 36 and 38 will be closed. Conversely, when the solid portion of the shield assembly is between a magnet and its respective switch, the switch contacts 36 and 38 will be open.

Referring to FIGURE 3, each magnetic reed switch 28, 30 and 32 undergoes two complete operations per revolution of the rotor shaft 14. For purposes of illustration, each magnetic reed switch can be made to be open for 90°, closed for 90°, open for 90° and closed for 90° with a proper adjustment of the cut-out discs 52 and 54. It is in this manner that the coils of the stator are energized to produce a rotating magnetic flux field of square wave form and thus cause rotation of the permanent magnet rotor 12.

Figure 6:
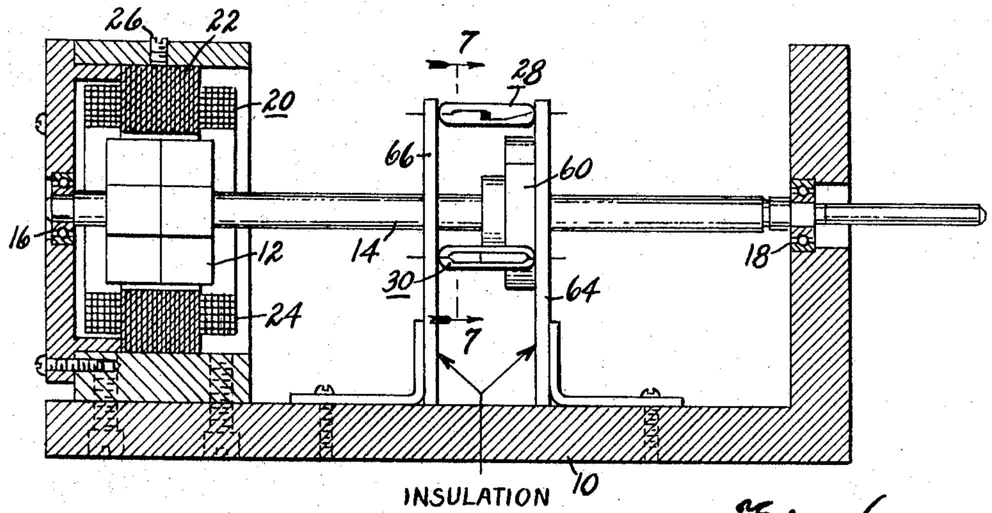
FIGURE 6 is a longitudinal sectional view of the preferred fixture model of a brushless direct current electric motor constructed according to my invention.
Figure 7:
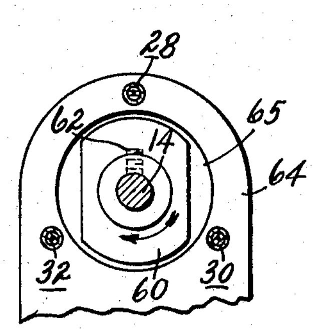
FIGURE 7 is a fragmentary sectional view taken along line 7—7 of FIGURE 6.

Referring to FIGURES 6 and 7, in the preferred construction of my brushless direct current motor, the rotor 12 and stator assembly 20 are of identical construction to that described in connection with FIGURE 1 as is frame 10, but in this embodiment a two pole rotating abround permanent magnet 60 attached to the rotor shaft 14 is utilized to sequentially actuate the three magnetic reed switches 28, 30 and 32. The permanent magnet 60 is held in assembed relation with the rotor shaft 14 by a set screw 62 and the three magnetic reed switches 28, 30 and 32 are connected between spaced insulating supporting plates 64 and 66 attached to the frame 10. The support plate 64 has a circular aperture 65 as seen in FIGURE 7. As in the first embodiment, rotation of the permanent magnet 60 sequentially energizes the circumferentially spaced magnetic reed switches 28, 30 and 32 so as to produce a rotating square wave magnetic flux field in the stator coils 24.

Figure 8:
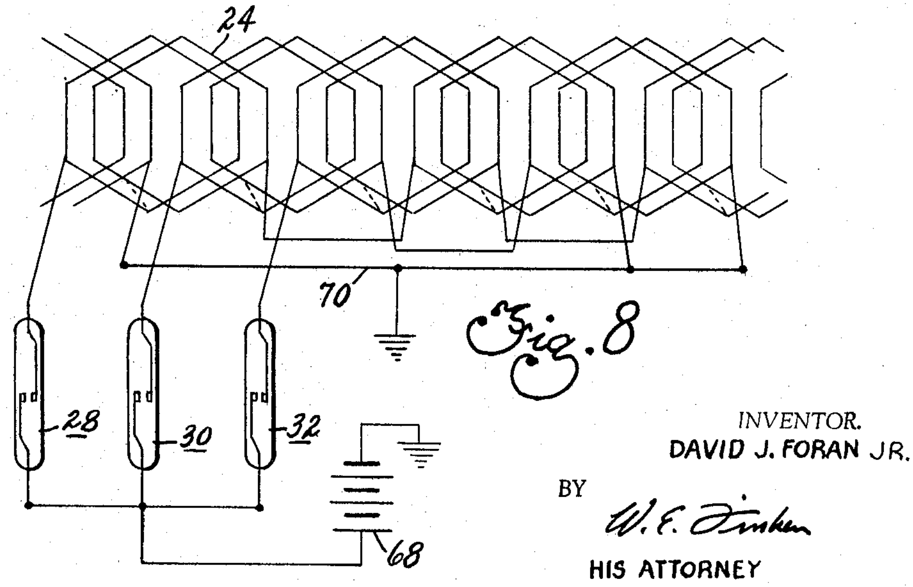
FIGURE 8 is a schematic wiring diagram of the commutation means for the wound stator.

As seen in FIGURE 8, the winding of the stator assembly 20 is of the three phase, four pole type with four coils per phase. The coil span is six stator slots. Magnetic reed switch 28 is connected to the phase 1 coils, magnetic reed switch 30 is connected to the phase 2 coils, and magnetic reed switch 32 is connected to the phase 3 coils. The magnetic reed switches are connected to a direct current power supply, for example, a battery 68, and the field coils are in turn connected to a ground lead 70.

While the embodiments of the present invention as herein disclosed constitute preferred forms, it is to be understood that other forms might be adopted.

What is claimed is as follows:

1. A brushless direct current electric motor including, a frame, a four pole permanent magnet rotor having a shaft journalled in said frame, four pole wound stator encircling said rotor, three magnetic reed switches connected between a source of direct current power and each phase of said wound stator, and permanent magnet means sequentially actuating said switch to produce a square wave rotating magnetic flux field in said stator so as to cause rotation of said rotor, said magnetic reed switches are mounted on a support located at right angles to the axis of said rotor shaft, wherein said magnet means comprises three permanent magnets mounted on a second plate axially spaced from said first plate, and slotted magnetic shielding means connected to said rotor shaft and disposed between said permanent magnets and said magnetic reed switches.

2. The brushless direct current electric motor set forth in claim 1 wherein said magnetic reed switches are angularly spaced apart by 120°, and wherein each permanent magnet is in alignment with its respective magnetic reed switch.

3. The brushless direct current electric motor set forth in claim 1 wherein said magnetic reed switches are mounted between a pair of supporting plates with their axes parallel to but spaced from the axis of said rotor shaft, and wherein said magnetic means comprises a two pole permanent magnet attached to said rotor shaft between said two plates.

4. The brushless direct current electric motor set forth in claim 3 wherein said magnetic reed switches are angularly spaced apart by 120°, and wherein said two pole permanent magnet is of round configuration.

References Cited by the Examiner

UNITED STATES PATENTS

| | | | |
|---|---|---|---|
| 2,558,540 | 6/1951 | Clos | 310—46 |
| 3,096,467 | 7/1963 | Angus et al. | 310—46 X |
| 3,147,350 | 9/1964 | Lindley | 200—87 |
| 3,210,498 | 10/1965 | Jackson et al. | 200—87 |

MILTON O. HIRSHFIELD, *Primary Examiner.*

D. F. DUGGAN, *Assistant Examiner.*